Sept. 30, 1930.   G. R. WEBBER   1,777,269
DISTRIBUTING MACHINE
Filed March 17, 1928   6 Sheets-Sheet 1

Sept. 30, 1930.　　　G. R. WEBBER　　　1,777,269
DISTRIBUTING MACHINE
Filed March 17, 1928　　6 Sheets-Sheet 2

Inventor
George R. Webber
by  　Attorney

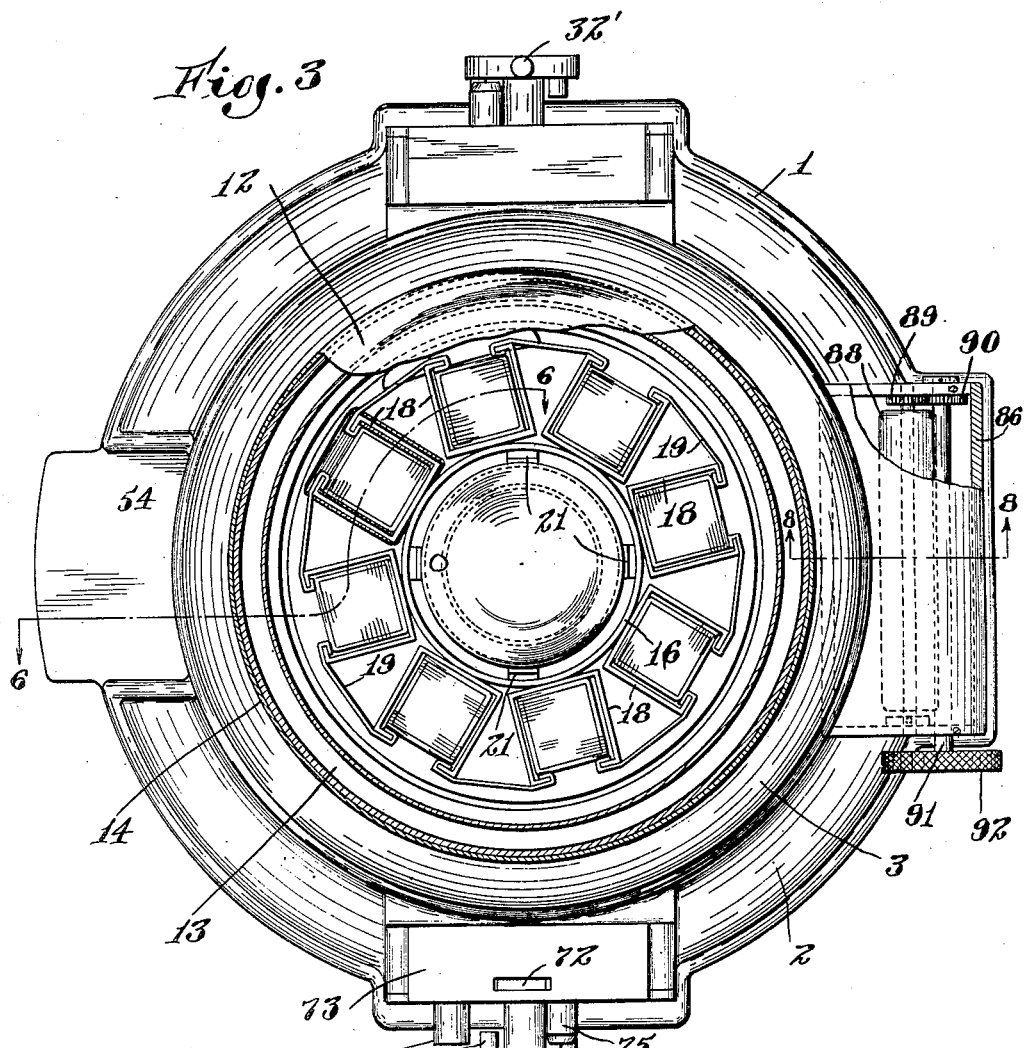
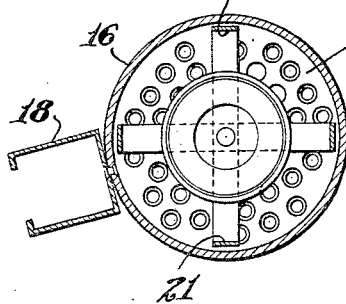
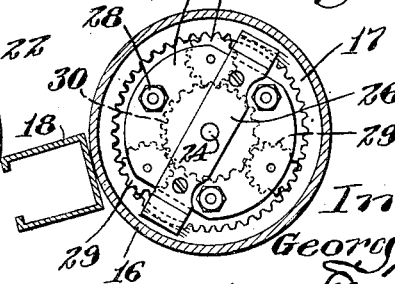

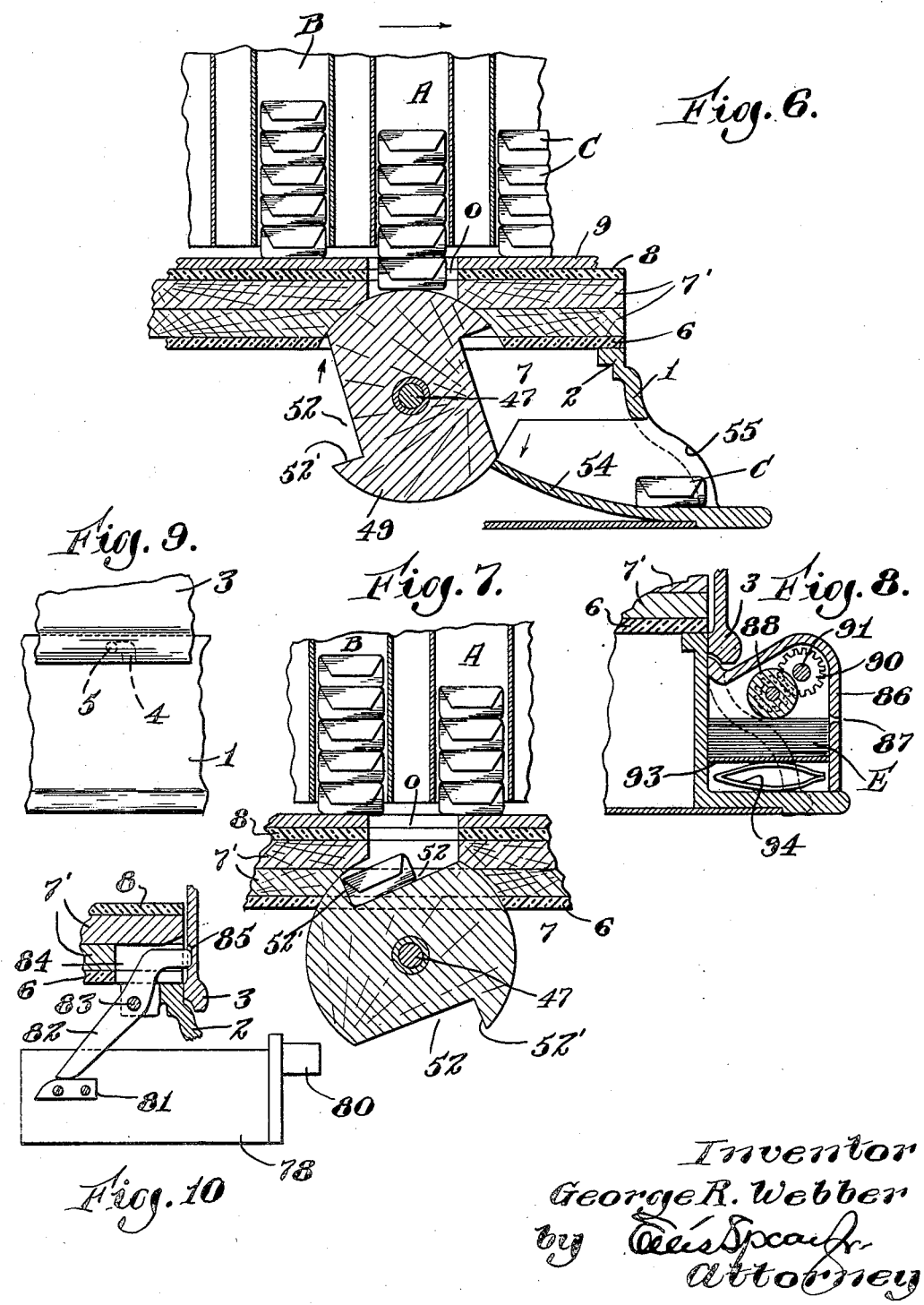

Sept. 30, 1930.　　　G. R. WEBBER　　　1,777,269
DISTRIBUTING MACHINE
Filed March 17, 1928　　6 Sheets-Sheet 5
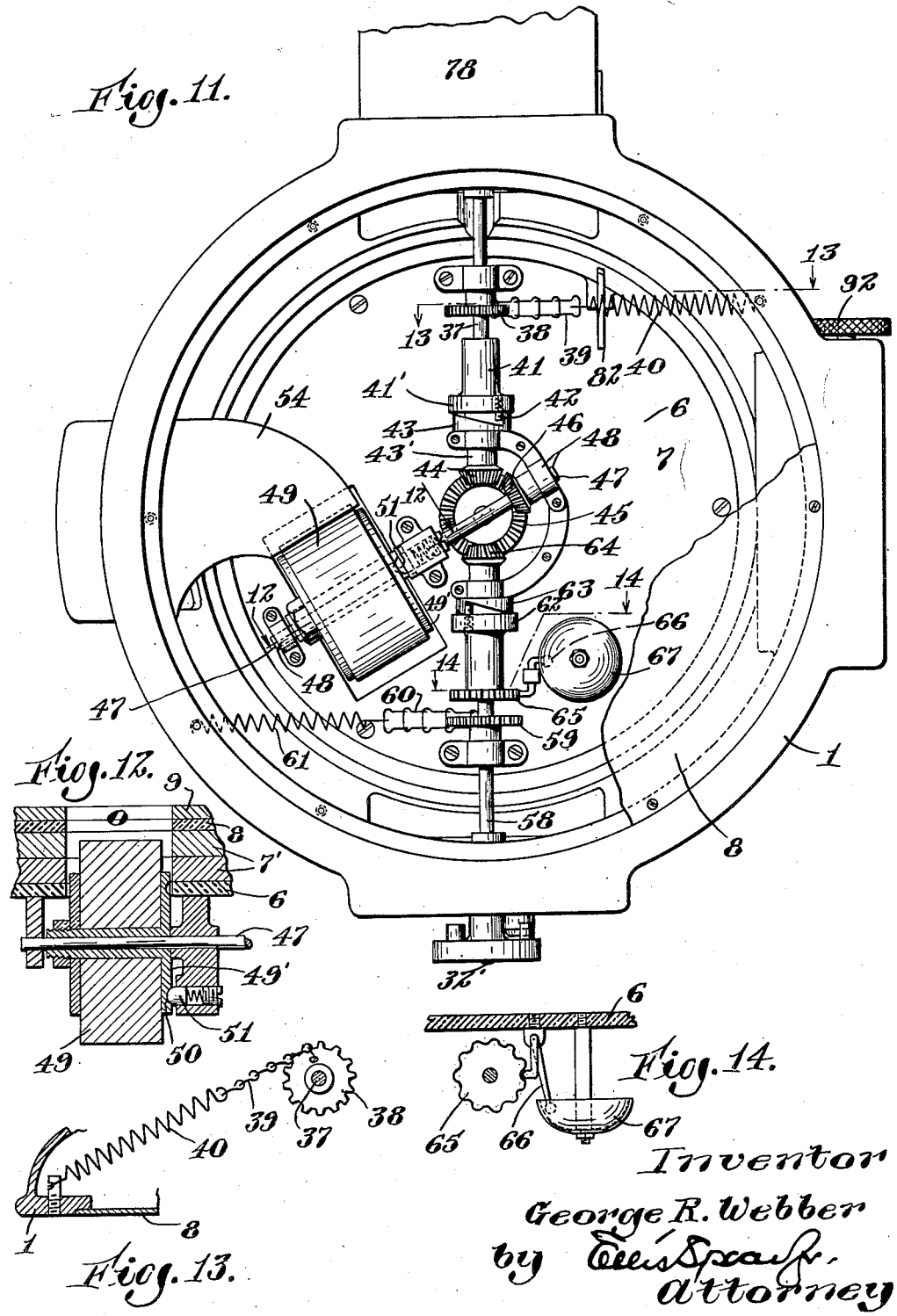

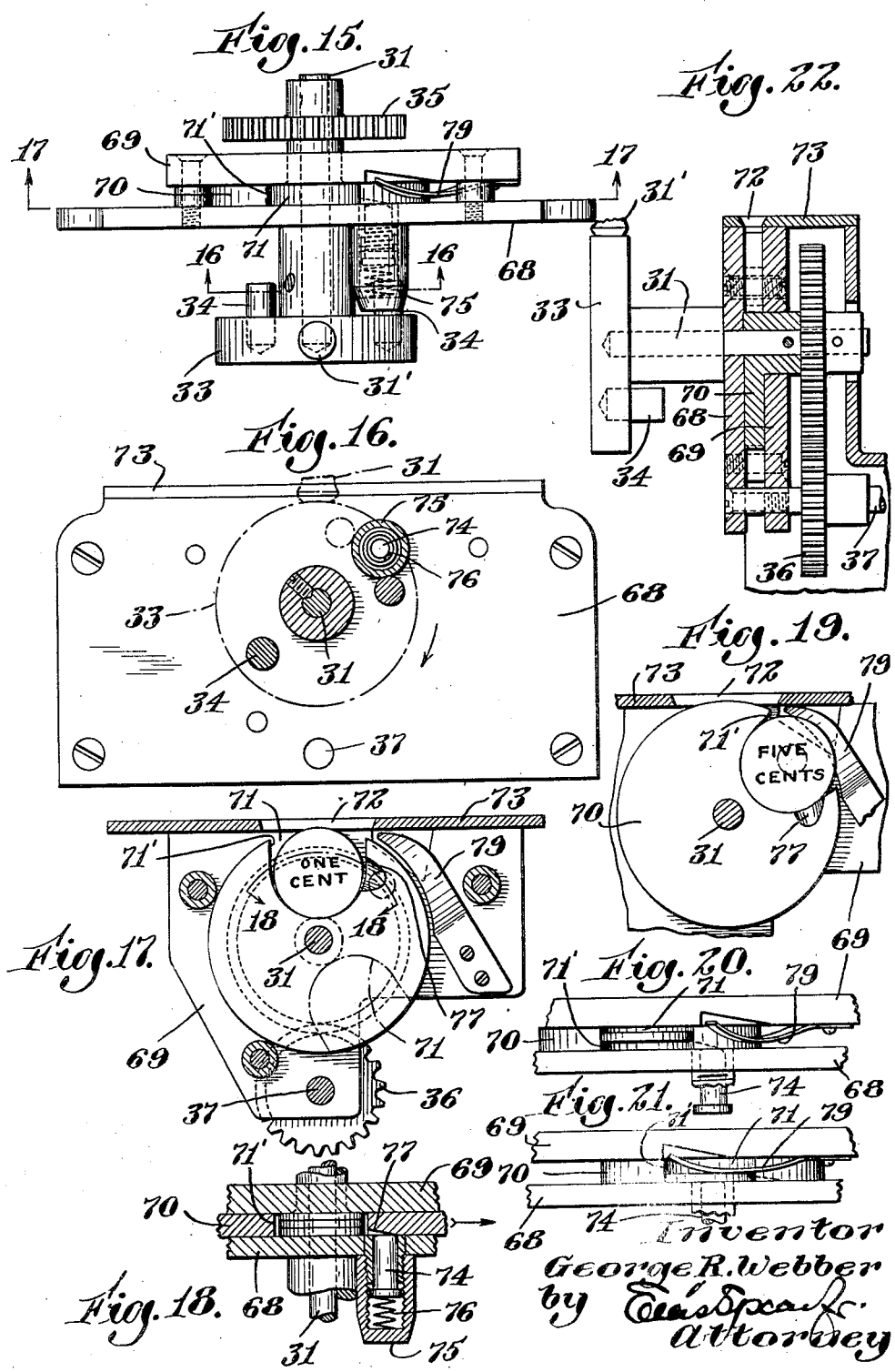

Patented Sept. 30, 1930

1,777,269

UNITED STATES PATENT OFFICE

GEORGE R. WEBBER, OF AUGUSTA, MAINE, ASSIGNOR TO POLAR VEND CORPORATION, OF AUGUSTA, MAINE, A CORPORATION OF MAINE

DISTRIBUTING MACHINE

Application filed March 17, 1928. Serial No. 262,442.

This invention relates to vending or distributing machines, and particularly to a machine for storing and distributing certain perishable commodities which from their very nature must be kept within certain thermal limits during display and distribution in order to prevent deterioration thereof.

The distribution of such commodities not only involves the effective display of the goods so as to take full advantage of their sales appeal but requires that the thermal limits be maintained at all times, and particularly during the actual delivery of the goods.

In addition, the manner in which the goods themselves are labeled presents certain difficulties as regards their delivery, particularly where the articles are provided with glued labels which frequently cause the articles to adhere together, thus resulting in misdeliveries when gravity alone is relied upon to accomplish the delivery. And, finally, it is imperative that the machine where coin-controlled will be positive and certain in operation to the end that the user will always obtain the goods for which he pays, and at the same time will be incapable of false operation by means of spurious coins or coins of less denomination than those with which the machine is intended to operate.

To the end therefore of providing a machine which will embody the foregoing desiderata, I have devised my present invention. According to it the goods are so displayed as to present the maximum sales appeal, while at the same time being maintained at the proper temperature or within predetermined thermal limits, particularly during the actual delivery thereof, at which time the opening of the refrigerated display container to permit the physical discharge of the goods makes for a lowering of the maintained temperature within such container. Moreover, article delivery itself is accomplished in such a manner as to avoid all possibility of misdeliveries, due to the tendency of the articles, where provided with glued labels, to adhere to each other, all in a machine which is so controlled as to coin or slug operating features, as to be positive and certain in operation and incapable of false operation.

For the purposes of this application, I shall discuss my invention in its relation to the distribution of such a familiar article of everyday use as the yeast cake. Such an article not only must be kept within certain thermal limits while on display but presents certain problems peculiar to any similarly wrapped and labeled article as regards its mechanical delivery from the thermal display container. I have therefore selected the yeast cake as characteristic of the problems involved, but it is to be understood that this treatment is purely illustrative and in no way limiting, and that my machine is capable of use with other articles, of like or similar problem, such as "Eskimo pies", or similar ice cream confections, soft-center candy bars, and in fact a variety of different commodities.

In the accompanying drawings, I have shown a form of my machine which I have found well adapted to the requirements of manufacture and satisfactory under conditions of actual use. Throughout the specification and drawings, like reference characters are correspondingly applied, and In the drawings:—

Fig. 3 is a plan view, partly broken away.

Figure 2:
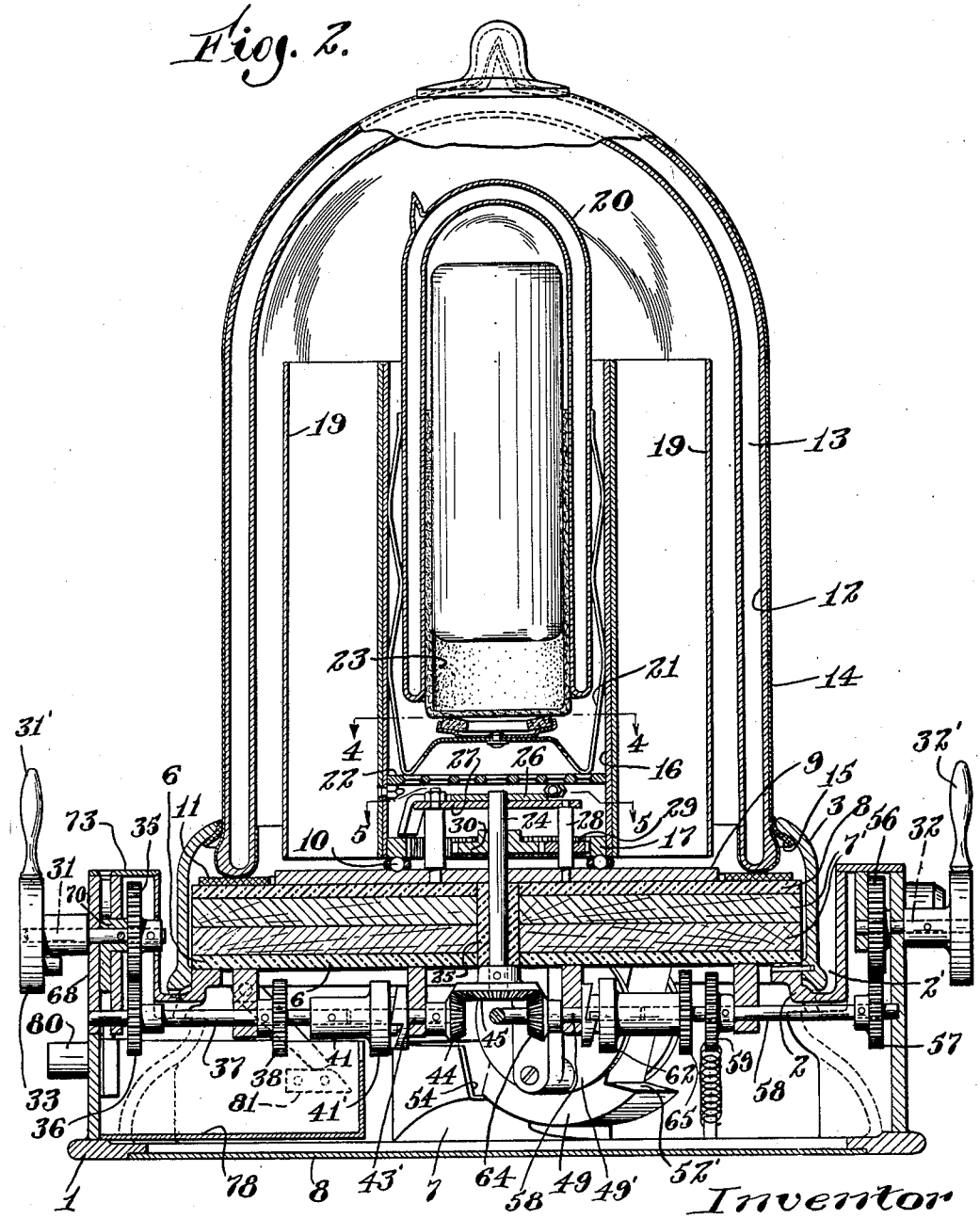
Fig. 2 is a section on the line 2—2 of Fig. 1.

Figs. 4 and 5 are sections on the lines 4—4 and 5—5, respectively, of Fig. 2.

Fig. 6 is a section on the line 6—6 of Fig. 3 and showing the rotatable delivery member in its initial phase of delivery movement.

Fig. 7 is a view similar to Fig. 6 but showing said member in a subsequent phase of movement.

Fig. 8 is a fragmentary section on line 8—8 of Fig. 3.

Fig. 9 is a fragmentary detail showing the quick detachable connection between the dome clamping ring and base.

Fig. 10 is a fragmentary detail showing the coin-drawer lock for said clamping ring, such lock being automatically applied by the insertion of the coin drawer into the machine.

Fig. 11 is a bottom view, partly broken away, of the machine base, particularly showing the operating mechanism.

Figs. 12, 13, and 14 are sections on lines 12—12, 13—13, and 14—14, respectively, of Fig. 11.

Fig. 15 is a plan detail of the coin control lock.

Figs. 16 and 17 are sections on the lines 16—16 and 17—17 respectively, of Fig. 15.

Fig. 18 is a section on the line 18—18 of Fig. 17.

Fig. 19 is a view similar to Fig. 17 but showing the operation of the lock when a five-cent piece is used instead of one-cent pieces as in Fig. 17.

Figs. 20 and 21 are plan views of Fig. 19 showing the successive positions of the lock mechanism when a five-cent piece is used, and Fig. 22 is an enlarged section along the operating knob shaft of the machine shown at the left in Fig. 2.

I have indicated generally at 1 the base of my machine. The base 1 is an annular casting having an internal flange 2 (Fig. 2) rising therefrom and shaped to provide a circular recess 2' for a dome-clamping ring 3 which is removably inserted in said recess from above and is interlocked with the base 1 by means of the bayonet slots 4 and locking pins 5 detailed in Fig. 9. Such slots and pins permit the ring 3 to be rotated into and out of lock with the base 1, subject however to an automatic coin-drawer lock which will later be described.

Seated on the upper face of the flange 2 is an insulating disc 6 defining with said base a chamber 7 sealed by a plate 8. Resting on the disc 6 is a deck or floor consisting of one or more layers (here shown as two) of balsa wood 7' covered on its upper face by a second disc 8 similar to the disc 6. Surmounting said upper disc 8 is a deck plate 9 having an annular ball race for a series of ball bearings 10. The plate 9 is of smaller diameter than the washer 8 and is surrounded by a cushioning and insulating washer 11 on which rests the lower edge of a transparent dome 12.

The dome 12 is a double walled glass ball providing for the full display of the yeast cakes C or other articles from all sides. The insulating space 13 between the double walls of the dome 12 is exhausted and sealed with a proper degree of vacuum so that the dome will maintain itself free from internal condensations which would obstruct the view of the goods displayed therein. If desired one or both surfaces of the dome 12 may be coated with a fragmentation deterrent film such as described and claimed in my companion application Serial No. 242,936 filed December 27, 1927, and the dome itself may be cushioned from the adjacent face of the dome clamping ring 3 as by means of the cushioning washer 15 shown in Fig. 2.

Supported within the dome 13 is a rotatable stack shell 16 within which the yeast cakes C or other articles are contained, together with the refrigerant by means of which the articles are maintained at the proper temperature within said dome.

The stack shell 16 is a cylindrical shell carrying at its lower end an internal ring gear 17 resting on the ball race 10. Spaced about the stack shell and carried by it is a series of vertical stack tubes 18 within which the yeast cakes C or other articles are loaded from above and from which they are delivered at the lower ends of the tubes through a suitably controlled discharge opening O in the deck 7' of the machine (Fig. 6).

Figure 1:
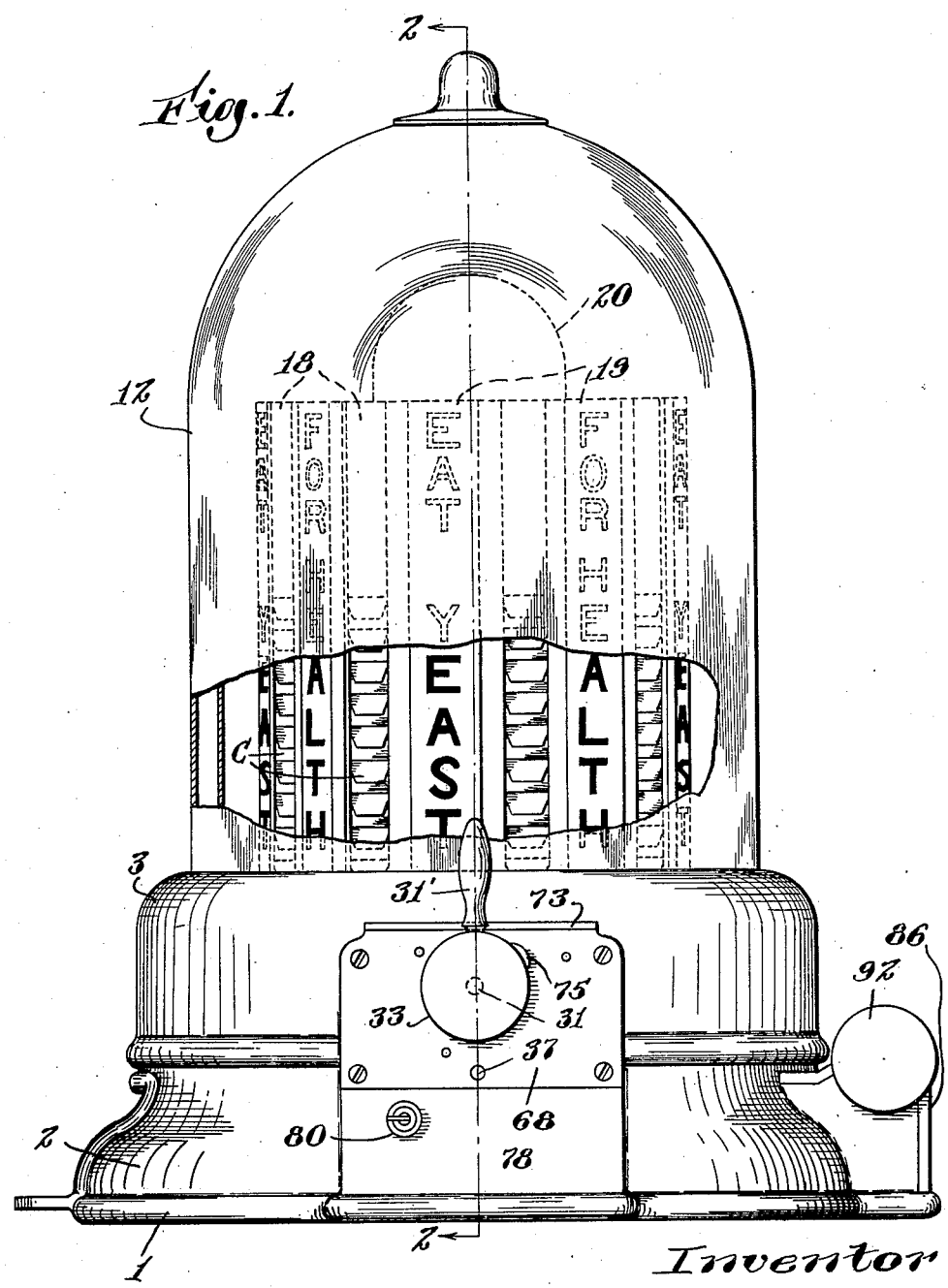
Fig. 1 is an elevation, partly broken away, of a dispensing machine in accordance with my invention.

The stack tubes 18 are so positioned relative to each other as to provide for the reception in the spaces between their adjacent side walls of a series of advertising display panels 19 (Fig. 1) which may be inserted into said spaces endwise from above and carry matter descriptive of the products being distributed.

The stack shell itself encloses a refrigerating unit which being centrally disposed with respect to the yeast cakes C uniformly cools the entire radial assembly of stack tubes and at the same time is substantially concealed from view so as not to detract from the sales efficiency of the machine. Such a unit may consist of a double walled vacuum vessel 20 provided with the usual spring frame 21 by means of which the vacuum vessel 20 is spaced from the stack shell 16 and cushioned against breakage. The spring frame 21 at its lower edge rests upon a perforated disc 22 fixed across the bottom end of the stack shell and perforated to permit the circulation of cool air from the refrigerating unit through the stack shell.

The refrigerating unit 20 may contain any suitable refrigerant. As here shown the refrigerant is a solidified refrigerant such as carbondioxide and the escape of the refrigerated gases from the vacuum container 20 is controlled by a porous slidable stopper 23 described and claimed specifically in my companion application Serial No. 244,338 filed January 3, 1928.

In my present machine, distribution of the goods is accomplished by manual operation, the stack shell being rotated a distance of one stack tube at each operation of the machine successively to discharge the lowermost yeast cake in the stack through the discharge opening O. This may be accomplished, either subject to a coin controlled lock, or the lock may be rendered ineffective and the machine operated as a free machine by means of a special detachable handle, as where the machine is used simply as a storage and display device and not as a coin operated vending machine.

Regardless of whether the machine is operated as a coin or a free machine, however, certain factors prevail which must be provided for at all times in respect to the delivery of the articles themselves. In such an article as a yeast cake, which is wrapped in tinfoil and provided with a glued label, the glue on the labels sometimes causes the adjacent cakes in the stack to adhere to each other. Where gravity alone is relied upon for the delivery, this tendency of the adjacent cakes to adhere to one another presents a factor which detracts from that positiveness and certainty of operation so necessary in a machine of this class. Moreover, the gravity feed of the yeast cakes involves the successive opening and closing of a trap door or other exit control for the cakes and while such opening and closing is only momentary, the effect thereof is cumulative in so far as the escape of the cold air from the refrigerating chamber of the machine is concerned. This results in a disturbance of the precise temperature which it is sought to maintain in the refrigerating chamber, and my present machine is designed not only to avoid any possibility of misdelivery of the cakes, due to their tendency to adhere to one another by reason of their glued labels, but also to avoid any pronounced disturbance of the maintained temperature within the refrigerating chamber.

To this end, the stack shell 16 is mounted for intermittent rotation about the deck 7' so as to present successively the individual stack tubes to the delivery mechanism, and the delivery mechanism itself is so constructed and arranged as positively to move the lowermost yeast cake in the delivering stack tube away from the cake next above, thus breaking any adherence which may have existed due to the glued labels. In addition, the construction and operation of the delivery mechanism is such as constantly to seal the discharge opening, thus preventing any disturbance of the maintained temperature within the dome 12 during the discharge of the yeast cake.

The intermittent rotation of the stack shell 16 in properly timed relation to the operation of the delivery mechanism is accomplished by means of a vertical drive shaft 24 for the shell. Said shaft is journaled through the deck 7' in a thermal-insulating bearing 25 (Fig. 2), and at its upper end, projects axially into the open bottom end of the stack shell, being steadied in a cross-plate 26, (Figs. 2 and 5), which is fastened to a bearing disc 27 carried on the upper ends of a radial series of spaced vertical stub shafts 28 rising from the disc 9 and themselves provided with pinions 29 meshing both with a central gear 30 fast on the shaft 24 and with the internal ring gear 17 at the lower end of the shell 16.

This provides for an internal concealed step-by-step rotation of the stack shell and at the same time leaves said shell internally free for the unobstructed circulation of the refrigerating gases.

The shaft 24 may be rotated in any desired manner. Where the machine is used as a coin-controlled vending machine, it is rotated subject, to a coin-controlled mechanism, from the operating knob shaft 31 at the left in Fig. 2. Where used as a free machine, it is rotated from the detachable handle shaft 32 at the right in Fig. 2. In either case, however, the operation is the same in so far as article delivery is concerned.

Considering first coin-controlled operation, the shaft 31 is journaled in suitable bearings at one side of the base 1, and at its outer end beyond said base is provided with an operating handle 31' by means of which said shaft may be rocked through a part revolution, the handle knob 33 being provided with limiting stops 34 for limiting the handle swing in either direction.

Fast on the inner end of the shaft 31 is a gear 35 meshing with a gear 36 on a countershaft 37 journaled beneath the shaft 31 in suitable bearings.

The shaft 37 is in effect a rock shaft, its return being effected after each actuation by a sprocket 38 on which is partially wound a chain 39 attached to a spring 40 which is anchored to the inside of the base 1.

Pinned to the shaft 37 beyond the sprocket 38 is a ratchet sleeve 41 which is flanged as at 41' and provided with a spring-pressed pawl 42. In one direction of rotation of shaft 37, the pawl 42 effectively engages the ratchet tooth 43 of a ratchet piece which is pinned to a stub shaft 43' alined with shaft 37 whereby to transmit rotation to said stub shaft. In the opposite direction of rotation of shaft 37, the pawl 42 ratchets idly past said tooth without transmitting rotation to the stub shaft.

At its inner end, the stub shaft 43' carries a bevel gear 44 which meshes with a similar gear 45 on the lower ends of the axis shaft 24, whereby to transmit the rocking motion of the shaft 37 to the shaft 24 as rotary motion and thus rotate said shaft 24 through a part revolution at each actuation of the rock shaft 37.

Meshing with the bevel gear 45 so as to be rotated therefrom, is a pinion 46, (Fig. 11), fast on an angularly disposed shaft 47 journaled in suitable bearings 48 on the underside of the base of the machine. This shaft is provided with a pocketed delivery roller 49 (Figs. 6, 7, and 12), operating beneath the discharge opening O of the deck. One face of one of the bearing plates 49' for said roller (Fig. 12) is provided with an annular series of spaced locating holes 50 within which a spring pressed detent 51 is adapted automatically to engage whereby accurately to center the roller with respect to the delivery opening O at each operation thereof.

The delivery roller 49 is formed as a disc having at opposite sides of its periphery a pair of alternately effective pockets 52. (Figs. 6 and 7.) These pockets are formed by simply removing slabs of the disc periphery at these points, the pockets merging into the periphery of the disc at one end and at their opposite end being shouldered as indicated at 52'. The periphery of the disc intermediate of said pockets however is disposed as a rounded bearing and sealing face closely fitting the similarly rounded wall of the delivery opening. This construction avoids the loss of any of the refrigerating gases through said delivery opening in any position of the delivery roller.

The actuation of the rock shaft 37 in its effective direction through the gears 44 and 45 rotates the axis shaft 24 through a partial revolution and this rotation is transmitted to the stack shell by means of the gear train 29, 30, and 17, whereby to rotate the stack shell a distance of one stack tube. The same actuation of the rock shaft through the gear 46 simultaneously rotates the roller shaft 47 through a half revolution, and during such rotation of said shafts 24 and 47 the delivery of the yeast cake is effected, as shown diagrammatically in Figures 6 and 7.

Referring to Fig. 6, the stack shell is shown in its normal position in which the stack tube A is registered with the delivery opening O and the lowermost cake in said tube A has dropped partially through said opening and is now resting upon the rounded periphery of the delivery roller 49.

In this position, the delivery opening is closely sealed by the rounded peripheral face of said roller. When the stack shell is rotated in the direction of the arrow, (Fig. 6), the tube A is carried past the delivery opening and in such action the lowermost cake in said tube is positively separated from the cake next above in the tube, thus breaking any adhesion between the cakes which may have resulted from the use of glued labels, and said lowermost cake is allowed to fall into the pocket 52 at the left of the delivery roller in Fig. 6, said roller having now been rotated into the position shown in Fig. 7, to receive the yeast cake. On the return movement of the rock shaft 37, the delivery roller continues its rotation in the same direction as previously, moving to the position shown in Fig. 6, and in such movement discharging the freed yeast cake from the delivery opening and out into the delivery chute 54 of the machine, the wall of the base being opened at this point, as indicated at 55 (Fig. 6) to permit the discharged cake to be picked up by the purchaser.

At no time during the discharge of the cake is the delivery opening O in communication with the outside atmosphere so that there is no loss of refrigerating gases within the display dome before, during or after delivery.

Where used as a free machine, the delivery action is the same, but the machine in such case is actuated by means of the shaft 32 at the right in Fig. 2, said shaft being provided with a detachable handle 32' and being geared at 56, 57 to a rock shaft 58 alined with shaft 37. The rock shaft 58 is equipped at 59, 60, 61 with drum chain and spring similar to 38, 39, and 40, and it and stub shaft 48' corresponding to stub shaft 43' are, provided with ratchets 62, 63 similar to ratchets 41, 43. Stub shaft 58' is provided with a gear 64 similar to gear 44 and meshing with gear 45 on shaft 24. (Figs. 2 and 11.)

Additionally, shaft 58 is provided with a star wheel 65 (Fig. 14) operating the tapper 66 of a bell 67 for audibly signalling operation of the machine by means of said shaft.

Where used as a coin-controlled machine, the effective actuation of rock shaft 37 is subject to a coin-controlled lock (Figs. 15 to 21 inclusive). Such lock consists of a face plate 68 secured to the base 1 and carrying a back plate 69 spaced therefrom a distance sufficient to allow a coin or slug carrier disc 70 to rotate therebetween. The disc 70 is pinned to the shaft 31 to rotate therewith and at its periphery is provided with a coin pocket 71 adapted to be brought into registry with a coin-slot 72 formed in a top plate 73 secured to plates 68 and 69 and defining with the adjacent portion of the base 1 a housing for the gear train 35, 36.

As contemplated herein, the lock is intended to operate only when either three pennies are placed at one time in the coin pocket 71 or when a five cent piece is placed in said pocket, and will not operate with any other coins, as for example with less than three pennies. This, of course, is purely arbitrary and can be changed according to the sales price of the particular product being vended, similarly the lock can be arranged to deliver one yeast cake for three cents or two yeast cakes for five cents. As shown, however, the mechanism delivers only one yeast cake at each operation, and will operate only with three pennies or a five cent piece.

With such an arrangement, therefore, the coin pocket is made as wide as a nickel and the same depth as a penny. Where one or two pennies only, or slugs or improper coins, are inserted in the coin pocket, the edge 71' of the pocket will contact a spring-pressed plunger 74 when the coin-carrier is turned in the direction of the arrow (Fig. 18) and effective operation of the machine will thus be prevented. The plunger 74 is slidably mounted in a suitable bearing 75 carried by the face plate 68 and is normally urged into the path of rotation of the coin-carrier by a coil spring 76, the adjacent face of the coin-carrier opposite said plunger being beveled off as indicated at 77 (Fig. 18) to permit positive projection of the plunger into the path of the carrier. The normal position of the parts, therefore, is a safe position wherein effective operation of the machine by anything less than the proper coinage is prevented.

Where the proper coinage is used, as where three pennies are inserted in the coin-pocket (Fig. 18) the physical presence of the three pennies themselves acts to overcome the plunger 74 and permit the effective operation of the machine. In such case, the combined thickness of the three pennies is sufficient to enable the outermost penny to push the plunger 74 outwardly, against the action of the spring 76, as the coin carrier is turned in the direction of the arrow in Fig. 18, permitting the shaft 31 to be rotated sufficiently far to effect delivery of the yeast cake, the spring 76 thereafter returning the plunger to normal obstructing position to avoid "repeating" the machine without further payment.

In the full swing of the shaft 31, as just described, the coin pocket is moved into the dotted line position of Fig. 17, and the pennies emptied therefrom into an underlying case drawer 78.

When a five cent piece is inserted in the coin pocket (Figs. 19, 20 and 21) and the coin carrier turned to the right in these figures, the coin first encounters the free end of a flat blade spring 79 which is attached to the back plate 69 and is pressed by said spring outwardly towards and against the projecting end of the plunger 74. The spring 79 is stronger than the spring 76 of the plunger and hence overcomes the plunger spring as the five cent piece is pressed against the plunger by the spring 79, so that the plunger is moved out of the way to permit effective operation of the machine. The free end of the spring 79 is bent inwardly so as to guide the five cent piece towards the plunger as the five cent piece is presented to said spring by the coin-carrier. With pennies, the spring 70 is ineffective, because the pennies are of less diameter than the nickel and hence can pass freely beneath the spring.

In addition, my machine is also provided with means whereby the presence of the coin drawer 79 in its proper drawer-slide opening of the base automatically locks the clamping ring 3 for the dome 12 in position on the machine so that unauthorized access to the machine is prevented.

To accomplish this, the coin drawer 78, is provided with any suitable key operated lock 90 whereby it may itself be locked in position, and with a lug 81 (Fig. 10) which in the inward movement of the drawer to its inserted position in the machine, contacts the outer end of a locking dog 82, which is pivoted between its ends as at 83 to the base, and at its inner end is disposed through a slot 84 in the deck 7' and engages in a locking notch 85 formed in the inner face of the ring periphery. The movement of the drawer to its inserted position within the machine thus automatically applies the lock 82 to prevent unauthorized access to the contents of the machine, as shown in Fig. 10.

If desired, my machine may further be provided with an envelope delivery mechanism by means of which a user may supply himself with an envelope within which to place the yeast cake, and I have shown in Figs. 3 and 8 a simple arrangement for this purpose. Referring to these figures, the casing 1 is formed at 86 to provide a housing for a stack of envelopes E from which the uppermost envelope is adapted successively to be withdrawn and delivery through the discharge slot 87 of said housing by means of a pick-off roller 88 geared at 89, 90 to a shaft 91 provided with an operating knob 92 by means of which said shaft may be rotated.

The stack of envelopes is supported within the housing on a spring-pressed follower 93, the spring for which is indicated at 94, and which progressively maintains the uppermost envelope in the stack level with the delivery slot 87 as the envelopes are successively withdrawn from the stack.

Various modifications as fall within the spirit and scope of my invention may obviously be resorted to if within the limits of the appended claims.

What I therefore claim and desire to secure by Letters Patent is:—

1. In a distributing machine, a base having a discharge opening, an article stack intermittently revoluble on said base past said opening, a vacuum enclosure for said stack, a pocketed discharge member having a constant sealing relation to said opening but rotatable with reference thereto to permit article discharge from said stack, and means for simultaneously rotating said stack and delivery member to effect positive separation of the lowermost article in said stack from the article next above and to bring a pocket of said delivery member into position to receive said separated article for subsequent ejection therefrom.

2. In a distributing machine, a base having a discharge opening, an article stack intermittently revoluble on said base past said discharge opening, a pocketed delivery member rotatable within said discharge opening, and means for simultaneously rotating said stack and delivery member positively to separate the lowermost article in the stack from the article next above and to bring a pocket of said delivery member into position to receive said separated article for subsequent ejection therefrom.

3. In a distributing machine, a base having a discharge opening, an article stack intermittently revoluble past said discharge opening, a pocketed delivery member rotatable within said discharge opening and presenting a rounded peripheral bearing face normally sealing said discharge opening when the stack is at rest and a peripheral pocket movable into article receiving relation to said discharge opening, and means for simultaneously rotating said stack and delivery member positively to separate the lowermost article in the stack from the article next above and deposit said separated article in the pocket of said delivery member for subsequent ejection therefrom.

4. In a distributing machine, a base having a discharge opening, a stack shell having an annular series of stack tubes and intermittently revoluble on said base past said discharge opening, a pocketed delivery member rotatable within said discharge opening and presenting a pair of rounded peripheral bearing faces alternately normally sealing said discharge opening when the shell is at rest and intermediate of said bearing faces presenting a pair of peripheral pockets alternately movable into article receiving relation to said discharge opening, and means for simultaneously rotating said shell and delivery member to bring one of its stack tubes into register with said discharge opening and positively to separate the lowermost article in said stack tube from the article next above and deposit said separated article in one of the pockets of said delivery member for subsequent ejection therefrom.

5. In a distributing machine, a base, a deck mounted thereon and having a discharge opening, a pocketed delivery member rotatable within said discharge opening, a stack shell having an annular series of stack tubes intermittently rotatable as a unit over said deck and successively registrable with said discharge opening for delivery of the lowermost article in the registering tube therethrough, and means for simultaneously rotating said stack series as a unit and said delivery member to effect discharge of the articles singly through said discharge opening.

6. In a distributing machine, a base, a deck mounted thereon and having a discharge opening, a pocketed delivery member rotatable within said opening, a stack shell having an annular series of stack tubes intermittently rotatable as a unit over said deck and successively registrable with said discharge opening for successive delivery of the lowermost article in the registering tube through said opening, a transparent vacuum encasement for said shell, a vacuum container enclosed within said shell and containing a refrigerant, and means for simultaneously rotating said stack series as a unit and said delivery member to effect discharge of the articles singly through said discharge opening.

7. In a distributing machine, a base, a deck mounted thereon and having a discharge opening, a pocketed delivery member rotatable within said opening, a stack shell having an annular series of stack tubes intermittently rotatable as a unit over said deck and successively registrable with said discharge opening for successive delivery of the lowermost articles in the registering tube through said opening, a ring gear carried by said shell, a drive shaft disposed axially of said ring gear and operatively connected therewith, an operating member, a rock shaft actuated therefrom, a spring return for said rock shaft, an intermediate shaft having a pawl and ratchet drive with said rock shaft and itself operatively connected with said shell drive shaft, and a shaft driven from said intermediate shaft and carrying said delivery member.

8. In a distributing machine of the type wherein the article delivery mechanism is operated by a coin-controlled actuator, a base, a deck having a discharge opening, a dome clamping ring removably mounted on said base, a dome supported on said deck and externally clamped by said ring, a stack shell within said dome, a delivery mechanism cooperative with said shell, a coin collection receptacle removably mounted upon said base, and an internal lock for said dome clamping ring automatically applied by and in the movement of said coin collection receptacle to inserted position within said base.

9. In a distributing machine, a base, a deck having a discharge opening, a dome clamping ring removably mounted on said base, a dome supported on said deck and externally clamped by said ring, a coin collection receptacle removably mounted upon said base, and an internal lock for said dome clamping ring automatically applied by and in the movement of said coin collection receptacle to inserted position within said base.

10. In a distributing machine, a base presenting an annular recess and an included supporting flange, a deck resting on said flange, a dome surmounting said deck, and a dome clamping ring disposed in said recess and externally clamping said dome adjacent the lower edge.

11. In a distributing machine, a base presenting an annular recess and an included supporting flange, a deck resting on said flange, a dome surmounting said deck, a dome clamping ring disposed in said recess and externally clamping said dome adjacent the lower edge, a coin collection receptacle removably mounted upon said base, and an internal lock for said dome clamping ring automatically applied by and in the movement of said coin collection receptacle to inserted position with said base.

12. In a distributing machine of the type wherein a coin-controlled operating shaft and a free operating shaft is each independently dominant upon an intermittently revoluble article mechanism and an article delivery member and wherein the coin-controlled shaft is provided with a rigidly attached operating handle and the free shaft is provided with a detachable and removable operating handle, motion transmitting connections between said shafts and said magazine and delivery member, said connections including a ring gear carried by said magazine, a drive shaft disposed axially of said ring gear and operatively connected therewith, independent rock shafts actuated each from one of said operating shafts, an independent spring return for each rock shaft, independent intermediate shafts each having a pawl and ratchet drive from said rock shafts and each itself operatively connected with said magazine drive shaft, and a delivery shaft independently driven from said intermediate shafts and carrying said delivery member.

In testimony whereof I affix my signature.

GEORGE R. WEBBER.